H. M. Paine.
Centrifugal Pump.

N° 101,306. Patented Mar. 29, 1870.

Witnesses;
John Davidson
George P. Paine

Inventor;
Henry M. Paine

United States Patent Office.

HENRY M. PAINE, OF NEWARK, NEW JERSEY.

Letters Patent No. 101,306, dated March 29, 1870; antedated February 23, 1870.

IMPROVEMENT IN ROTARY HYDRO-PNEUMATIC PUMPS.

The Schedule referred to in these Letters Patent and making part of the same.

*To all whom it may concern:*

Be it known that I, HENRY M. PAINE, of the city of Newark, State of New Jersey, have invented a new and useful Rotary Air-Pump; and I do hereby declare that the following is a full, clear, and exact description of the construction and operation of the same, reference being had to the annexed drawings making part of this specification.

The object of my invention is two-fold; first, to secure a steady blast, and second, the surcharging of the air with fluid particles.

Figure 1:
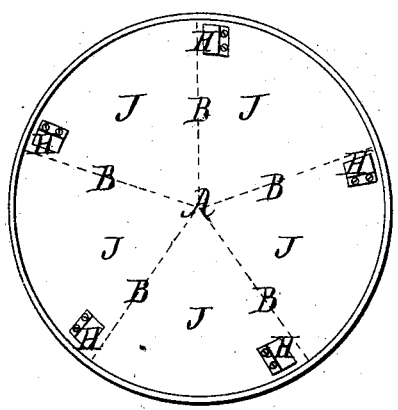

In order to accomplish these results I divide a cylender, A, Figure 1, into copartments, J J J J. The division walls B B B B, figs. 1 and 2, which is a longitudinal cross-section, extend about four-fifths of the cylinder's length, and the end of the cylinder is capped with a head, C, fig. 2, and thus forms a chamber, D.

Figure 2:
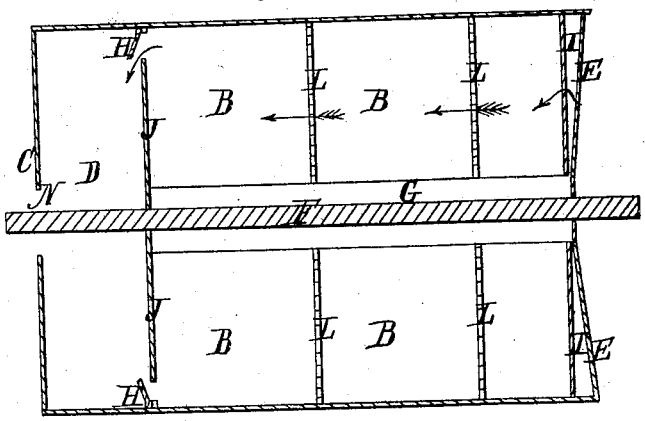
Figure 3:
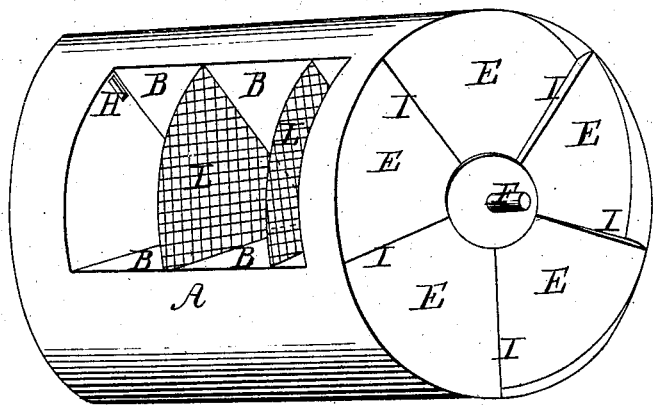

Each copartment on the opposite end of the cylinder communicates with the outer air by means of helical caps, E, figs. 2 and 3. The chamber-ends, J, figs. 1 and 2, are separately closed, and the copartments communicate with the chamber D through the valves H, figs. 1, 2, and 3.

The division walls B, figs. 1, 2, and 3, do not meet the shaft F, but leave a free space, G, fig. 2, communicating with all the copartments.

In order to fully saturate the air I place wire-gauze or other porous diaphragms L, figs. 2 and 3, in the copartments.

If the cylinder be immersed below the wall-opening G, and rotated, air will enter at the openings I, figs. 2 and 3, and, traversing through the diaphragms L, pass into the chamber D through the valves H, fig. 2, and carried from thence to the place of its use by means of a siphon pipe, not shown, entering at N, fig. 2. The air in traversing the porous diaphragms will become saturated with particles of whatever fluid the cylinder may be immersed in.

As the cylinder rotates a pressure will be generated in the chambers D, which will keep the valves H closed till the pressure in the copartments equals that in the chamber before they open, and thus secure a continous blast.

What I claim as my invention, and desire to secure by Letters Patent, is—

1. The diaphragms L L in the segmental chambers, as arranged in relation to the induction-opening and eduction-valves of a rotary hydro-pneumatic pump, substantially as described.

2. A revolving air-pump divided into segmental chambers containing diaphragms, one or more, as shown, the several chambers communicating at the axis of the cylinder, and the current of air entering through oblique openings in the cap forming one head of the cylinder, and being forced through valves in a position near the opposite end, as the divisions successively descend below the line of water in which the cylinder is immersed, all substantially as described.

HENRY M. PAINE. [L. S.]

Witnesses:
JOHN DAVIDSON,
GEORGE P. PAINE.